(12) United States Patent
Lemieux et al.

(10) Patent No.: US 11,196,362 B2
(45) Date of Patent: Dec. 7, 2021

(54) SYSTEM FOR CONTROLLING A PLURALITY OF SYNCHRONOUS PERMANENT MAGNET ELECTRONICALLY COMMUTATED MOTORS

(71) Applicant: ANNEXAIR INC., Drummondville (CA)

(72) Inventors: François Lemieux, Drummondville (CA); Thomas Libanet, Drummondville (CA)

(73) Assignee: ANNEXAIR INC., Drummondville (CA)

( * ) Notice: Subject to any disclaimer, the term of this patent is extended or adjusted under 35 U.S.C. 154(b) by 0 days.

(21) Appl. No.: 16/411,365

(22) Filed: May 14, 2019

(65) Prior Publication Data

US 2019/0267918 A1    Aug. 29, 2019

Related U.S. Application Data

(63) Continuation of application No. PCT/CA2018/051373, filed on Oct. 30, 2018.

(60) Provisional application No. 62/579,103, filed on Oct. 30, 2017.

(51) Int. Cl.
  *H02P 6/04* (2016.01)
  *H02M 5/458* (2006.01)
  *H02P 27/04* (2016.01)
  *H02P 5/74* (2006.01)

(52) U.S. Cl.
  CPC ............ *H02P 6/04* (2013.01); *H02M 5/4585* (2013.01); *H02P 5/74* (2013.01); *H02P 27/04* (2013.01)

(58) Field of Classification Search
  CPC ................................ H02P 6/04; H02M 5/4585
  USPC .......................................................... 318/400
  See application file for complete search history.

(56) References Cited

U.S. PATENT DOCUMENTS

| | | | |
|---|---|---|---|
| 4,255,089 A | 3/1981 | Phillips et al. | |
| 5,422,550 A | 6/1995 | McClanahan et al. | |
| 5,785,244 A | 7/1998 | McBroom | |
| 5,989,614 A * | 11/1999 | Zittel .................. | A23N 12/023 |
| | | | 426/481 |
| 6,133,699 A | 10/2000 | Vrionis et al. | |
| 6,397,611 B1 | 6/2002 | Yamato et al. | |

(Continued)

FOREIGN PATENT DOCUMENTS

| | | |
|---|---|---|
| CN | 201025269 Y | 2/2008 |
| WO | 03077266 A1 | 9/2003 |

(Continued)

OTHER PUBLICATIONS

English Abstract of CN201025269 retrieved on Espacenet on Apr. 19, 2019.

(Continued)

*Primary Examiner* — Muhammad S Islam
*Assistant Examiner* — Devon A Joseph
(74) *Attorney, Agent, or Firm* — BCF LLP

(57) ABSTRACT

A system for simultaneously controlling a plurality of PM AC motors includes a single VFD operatively connected to a power source. The single VFD is programmable to have predetermined operating conditions. The plurality of PM AC motors is operatively connected to the single VFD. Each PM AC motor is free of a built-in VFD. Each PM AC motor is operated in accordance with the operating conditions of the single VFD.

13 Claims, 5 Drawing Sheets

(56) References Cited

U.S. PATENT DOCUMENTS

| | | | |
|---|---|---|---|
| 6,809,484 B2 | 10/2004 | Makaran et al. | |
| 6,895,176 B2 | 5/2005 | Archer et al. | |
| 7,075,255 B1 | 7/2006 | Gambiana et al. | |
| 7,099,793 B2 * | 8/2006 | Rechberger | H02P 9/006 |
| | | | 702/130 |
| 7,193,826 B2 | 3/2007 | Crane et al. | |
| 7,640,761 B2 | 1/2010 | Garrett et al. | |
| 7,714,524 B2 | 5/2010 | Frankel et al. | |
| 7,770,806 B2 | 8/2010 | Herzon et al. | |
| 7,791,215 B2 * | 9/2010 | Barthold | H04B 3/58 |
| | | | 307/3 |
| 8,030,862 B2 | 10/2011 | Archer | |
| 8,247,695 B2 * | 8/2012 | Nakamura | H01B 9/026 |
| | | | 174/113 R |
| 8,299,646 B2 | 10/2012 | Rockenfeller et al. | |
| 8,672,733 B2 | 3/2014 | Chen et al. | |
| 8,814,639 B1 | 8/2014 | Mecozzi | |
| 8,912,739 B2 * | 12/2014 | Kobayashi | H02P 29/662 |
| | | | 318/400.02 |
| 9,172,319 B2 * | 10/2015 | Ozaki | H02K 7/10 |
| 9,253,928 B2 | 2/2016 | Dickinson et al. | |
| 9,325,272 B2 | 4/2016 | Haugen et al. | |
| 9,383,265 B2 * | 7/2016 | Dib | H02P 21/141 |
| 9,391,497 B2 | 7/2016 | Ramsingh | |
| 9,484,791 B2 * | 11/2016 | Brockerhoff | H02K 11/21 |
| 9,494,952 B2 | 11/2016 | Storm et al. | |
| 9,531,247 B2 | 12/2016 | Kuznetsov | |
| 9,855,858 B2 * | 1/2018 | Li | B60L 15/32 |
| 2003/0168229 A1 * | 9/2003 | Whidden | H01B 9/029 |
| | | | 174/389 |
| 2003/0168242 A1 * | 9/2003 | Whidden | H01B 9/029 |
| | | | 174/113 R |
| 2005/0093942 A1 | 5/2005 | Kawamura et al. | |
| 2005/0247073 A1 * | 11/2005 | Hikawa | H02P 21/13 |
| | | | 62/228.1 |
| 2005/0250374 A1 * | 11/2005 | Hung | H01R 31/06 |
| | | | 439/488 |
| 2007/0074716 A1 * | 4/2007 | McNulty | H02P 5/74 |
| | | | 126/578 |
| 2007/0200528 A1 * | 8/2007 | Itou | H02P 21/06 |
| | | | 318/719 |
| 2008/0303475 A1 * | 12/2008 | Patel | H02P 21/141 |
| | | | 318/634 |
| 2009/0174351 A1 * | 7/2009 | Eisenhardt | G01K 7/42 |
| | | | 318/400.21 |
| 2010/0029195 A1 | 2/2010 | Jalali et al. | |
| 2010/0276929 A1 * | 11/2010 | Jansen | G01K 7/42 |
| | | | 290/44 |
| 2011/0018472 A1 * | 1/2011 | Rockenfeller | H02P 5/74 |
| | | | 318/51 |
| 2012/0244015 A1 | 9/2012 | Benson et al. | |
| 2014/0197768 A1 * | 7/2014 | Haugen | H02J 4/00 |
| | | | 318/442 |
| 2015/0030469 A1 | 1/2015 | Hopkins et al. | |
| 2015/0288271 A1 * | 10/2015 | Kuznetsov | H02P 9/14 |
| | | | 322/63 |
| 2016/0047184 A1 * | 2/2016 | Luharuka | B01F 7/167 |
| | | | 166/250.01 |
| 2017/0264220 A1 * | 9/2017 | Rattan | H02P 27/06 |

FOREIGN PATENT DOCUMENTS

| | | | |
|---|---|---|---|
| WO | 2005093942 A1 | 10/2005 | |
| WO | 2017024609 A1 | 2/2017 | |

OTHER PUBLICATIONS

Dekker et al., "Controlling Multiple Motors with One VFD Saves Money and Space", VFDs Can Control Multiple Motors, https://www.automation.com/library/articles-white-papers/motor-drives-control/vfds-can-control-multiple-motors, pdf 6 pages.

Patel, "Controlling Multiple Motors with One VFD", Rockwell Automation, 2019, https://www.rockwellautomation.com/global/news/blog/detail.page?pagetitle=Controlling-Multiple-Motors-with-One-VFD&content_type=blog&docid=f1837ad0ac6268ac626957c350fe1f0f, pdf 2 pages.

"Single VFD for Multiple Motors", 2019, http://www.variablefrequencydrive.org/single-vfd-for-multiple-motors, pdf 2 pages.

"Electric Motors & Variable Frequency Drives", Energy Efficiency Reference Guide, BC Hydro, 2015, https://www.bchydro.com/content/dam/BCHydro/customer-portal/documents/power-smart/business/programs/electric-motor-vfd-reference-guide.pdf, 258 pages.

International Search Report and Written Opinion with regard to PCT/CA2018051373 completed Nov. 15, 2018.

* cited by examiner

SYSTEM FOR CONTROLLING A PLURALITY OF SYNCHRONOUS PERMANENT MAGNET ELECTRONICALLY COMMUTATED MOTORS

CROSS-REFERENCE TO RELATED APPLICATION

The present application is a continuation of International Patent Application No. PCT/CA2018/051373, filed on Oct. 30, 2018, entitled "SYSTEM FOR CONTROLLING A PLURALITY OF SYNCHRONOUS PERMANENT MAGNET ELECTRONICALLY COMMUTATED MOTORS", which claims priority to U.S. Provisional Patent Application Ser. No. 62/579,103, filed Oct. 30, 2017, entitled "SYSTEM FOR CONTROLLING A PLURALITY OF SYNCHRONOUS PERMANENT MAGNET ELECTRONICALLY COMMUTATED MOTORS", the entirety of all of which is incorporated herein.

TECHNICAL FIELD

The present technology relates to systems for controlling a plurality of synchronous permanent magnet electronically commutated motors.

BACKGROUND

There are countless systems using a plurality of alternative current (AC) motors as a source of motive power. For example, in heating, ventilating, and air-conditioning (HVAC) systems, it is known to use an air handling unit having a plurality of fan units arranged in an array to regulate air flow within the HVAC system, and each fan units includes an AC motor for powering a fan of the fan unit. In such systems, the plurality of AC motors is operatively connected to a power source, and one or more Variable Frequency Drive (VFD) is operatively connected between the power source and the AC motors. The VFD permits controlling the operation and several parameters of the AC motors, such as torque, speed of rotation, etc., and therefore, in HVAC systems, the VFD permits the control of the airflow within the HVAC system.

Other types of electric motors, such as synchronous permanent magnet electronically commutated motors (PM AC motors), have also been available for several years and have been used for various applications. PM AC motors are synchronous motors that receive their power via a VFD that includes an electronic circuit. For electronically commutated motors powered by AC current, the VFD produces an AC electric current driving each phase of the motor via a microcontroller. More particularly, the sensorless controller of the VFD provides pulses of AC current to each phase of the motor windings with a specific switching frequency. By selectively sending pulses of AC current to the motor windings with an appropriate switching frequency, the VFD is capable of controlling the speed and torque of the PM AC motor.

In many applications, using a PM AC motor presents substantial advantages over using AC motors (asynchronous motor) of comparable power output. Notably, PM AC motors have been found to have a reduced energy consumption compared to AC motors of the same power output. In some cases, the energy consumption of a PM AC motor is up to 30% less compared to an equivalent AC motor. The reduced energy consumption is achieved at least in part by the use of the VFD operated in PM motor mode which provides pulses of AC current to each phase of the motor windings more efficiently compared to a VFD that is typically used in conjunction with AC motors.

A PM AC motor is also generally smaller in size than an AC motor of comparable power output. The reduced size of the PM AC motor means that the housing or structure within which the PM AC motor is disposed can be smaller compared to a housing or structure suited to receive an AC motor of comparable power output, which may constitute an advantage under certain circumstances.

These advantages have led the market and several government authorities to promote the use of PM AC motors over AC motors in many applications. For example, in the air handling industry, there is a trend of increasingly using PM AC motors in place of AC motors to power the fans of air handling units because of their increased energy efficiency. However, although PM AC motors are more energy-efficient than AC motors, a PM AC motor is generally more expensive than an AC motor of comparable power output. One of the reasons that make the PM AC motor more expensive than a comparable AC motor is the fact that the PM AC motors that have been and that are still currently available on the market include a built-in VFD. In other words, the housing of the PM AC motor includes the PM AC motor itself and the VFD, which typically takes the form of an electronic circuit board that is disposed within the housing and operatively connected to the PM AC motor. The added complexity of including such a built-in VFD within the housing of the PM AC motor increases the costs of such motors, which may slow their adoption in certain applications.

New generations of PM AC motors and VFD have recently become available from certain manufacturers. In some models of PM AC motors of the new generation, the VFD is no longer built-in within the housing of the PM AC motor, but rather the VFD is offered as a standalone product. In applications where a plurality of PM AC motors are to be used in cooperation, such as in air handling units, manufacturers of PM AC motors and VFDs recommend using one VFD per PM AC motor in order to control each PM AC motor individually, or to form sub-groups of PM AC motors (where each PM AC motor is operatively connected to a corresponding VFD) and to operate each one of the sub-groups individually or in cooperation. These new generation products offer the advantage of permitting the installation of the VFD and of the corresponding PM AC motor at remote locations, which may be advantageous in certain situations where, for example, access to the PM AC motor is limited but facilitated access to the VFD is desired. However, such configuration does not present substantial cost savings and/or reduced complexity compared to using the previous generation of PM AC motor that included the built-in VFD, which again may slow the adoption of PM AC motors in certain applications.

Therefore, there remains a desire to have continued improvements in systems for controlling a plurality of PM AC motors that could lead to reduced complexity and costs compared to the solutions currently available.

SUMMARY

It is therefore an object of the present technology to ameliorate the situation with respect to at least one of the inconveniences present in the prior art.

It is also an object of the present invention to provide improved systems for controlling a plurality of PM AC motors at least in some instances as compared with some of the prior art.

According to an aspect of the present technology, there is provided a system for simultaneously controlling a plurality of PM AC motors with a single VFD. The system includes a single VFD operatively connected to a power source. The single VFD is programmable to have predetermined operating conditions. The system further includes the plurality of PM AC motors operatively connected to the single VFD. Each PM AC motor is free of a built-in VFD, and each PM AC motor is operated in accordance with the operating conditions of the single VFD.

In some implementations, the system includes a junction box. The junction box is adapted to connect the single VFD to the plurality of PM AC motors by a plurality of sets of wires. Each one of the sets of wires connects the single VFD to a distinct one of the PM AC motors.

In some implementations, the plurality of PM AC motors is operatively connected in parallel arrangement with the single VFD.

In some implementations, the sets of wires have equal impedance.

In some implementations, each wire of the sets of wires has an equal length and an equal diameter.

In some implementations, the plurality of PM AC motors is operatively connected in serial arrangement to the single VFD.

In some implementations, the single VFD includes current transducers for receiving AC voltage measurements from the plurality of PM AC motors.

In some implementations, each one of the plurality of PM AC motors is a three-phase, synchronous permanent magnet AC motor.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Introduction

Figure 4:
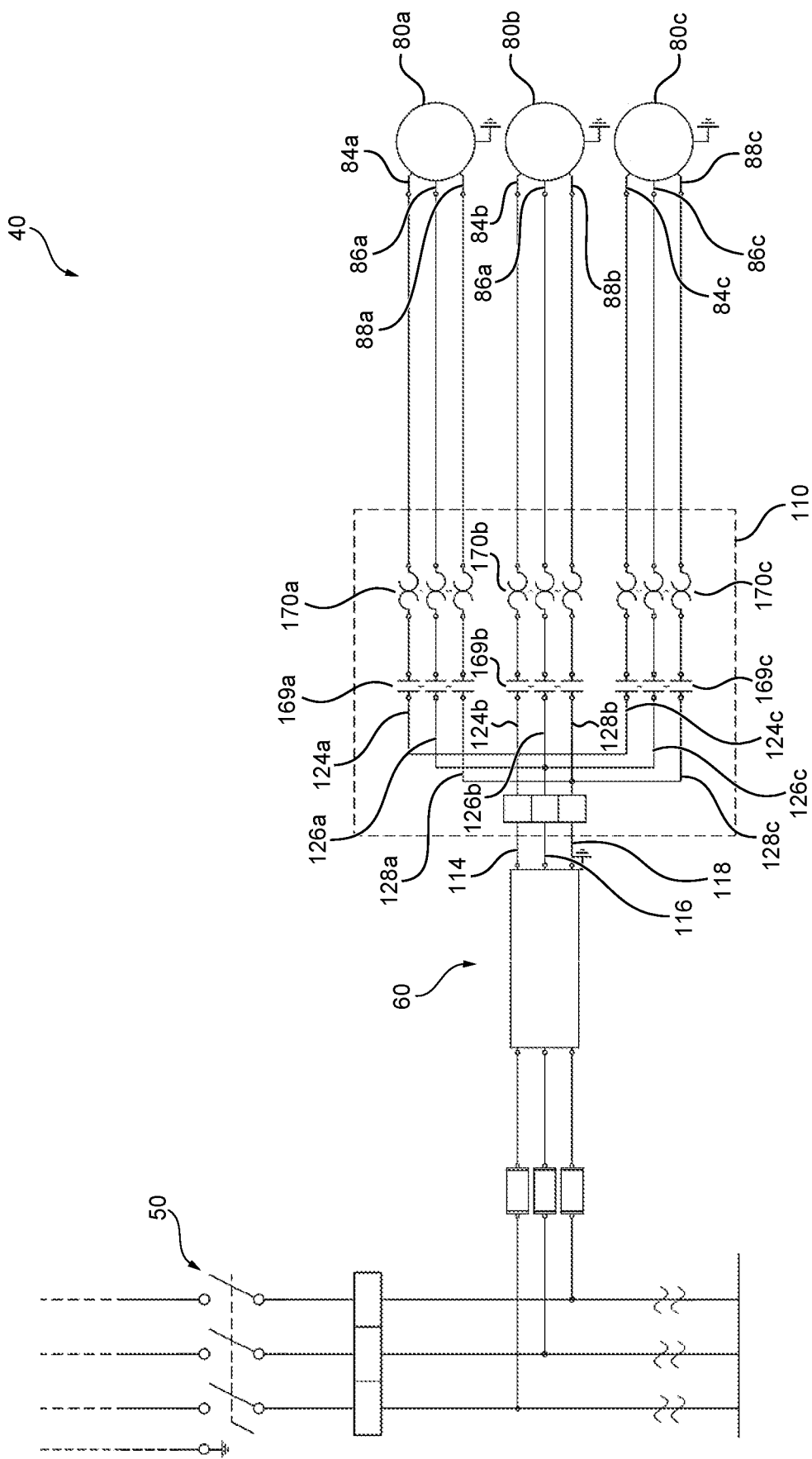
FIG. 4 is a schematic diagram of a system including a plurality of PM AC motors operatively connected to a single VFD via a junction box in accordance with an implementation of the present technology, with the PM AC motors configured in parallel arrangement.
Figure 5:
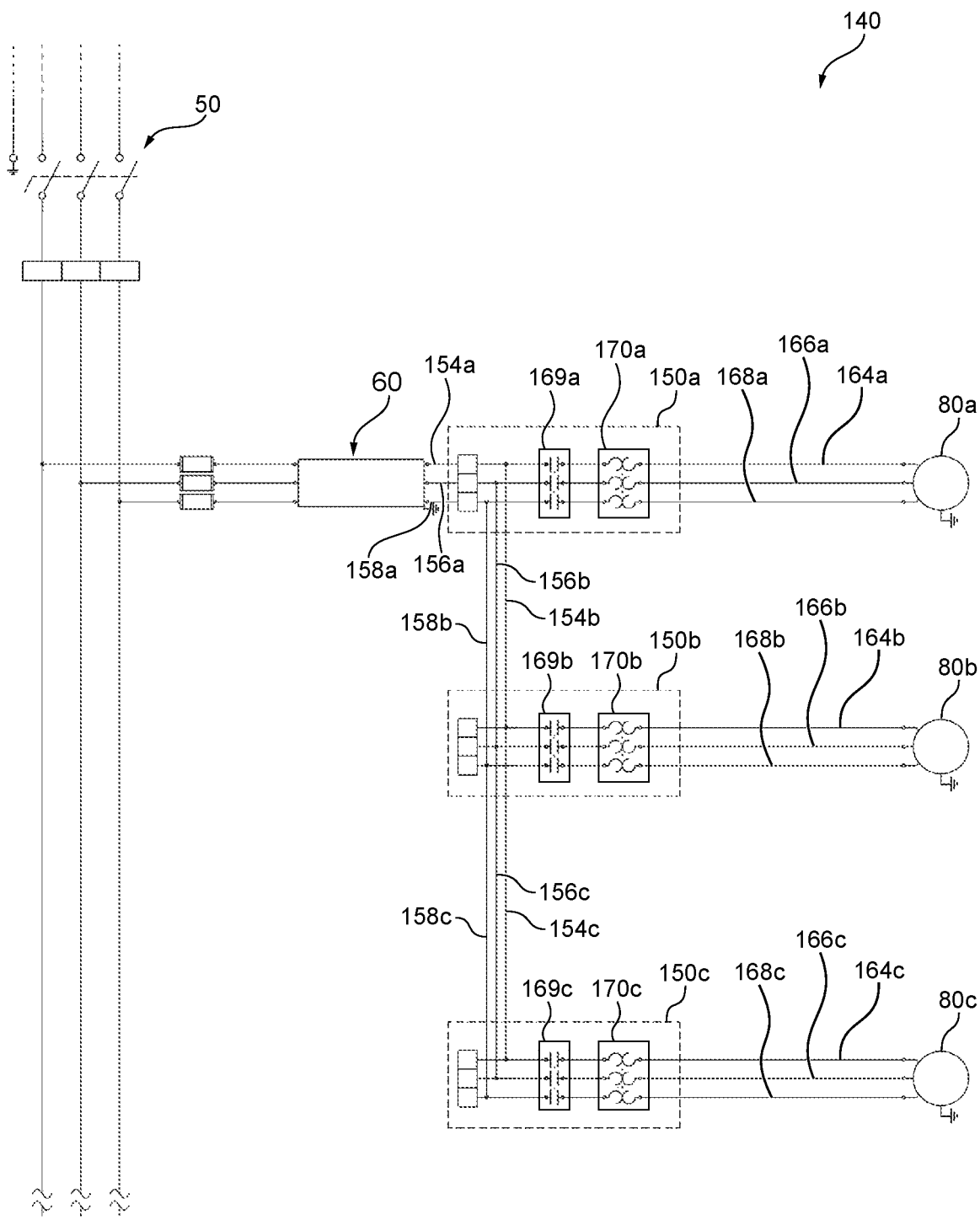
FIG. 5 is a schematic diagram of a system including a plurality of PM AC motors operatively connected to a single VFD, in accordance with another implementation of the present technology, with the PM AC motors configured in serial (or daisy chain) arrangement and a junction box operatively connected between the VFD and each PM AC motor.

With reference to FIGS. 4 and 5, implementations of the present technology, systems 40, 140 for controlling a plurality of PM AC motors, are illustrated. It is to be expressly understood that the systems 40, 140 are merely implementations of the present technology. Thus, the description thereof that follows is intended to be only a description of illustrative examples of the present technology. This description is not intended to define the scope or set forth the bounds of the present technology. In some cases, what are believed to be helpful examples of modifications or alternatives to the systems 40, 140 may also be set forth below. This is done merely as an aid to understanding, and, again, not to define the scope or set forth the bounds of the present technology.

These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing or embodying that element of the present technology.

As a person skilled in the art would understand, this is likely not the case. In addition, it is to be understood that the systems 40, 140 may provide in certain aspects a simple implementation of the present technology, and that where such is the case it has been presented in this manner as an aid to understanding. As persons skilled in the art would understand, various implementations of the present technology may be of a greater complexity than what is described herein.

General Description of the Systems

Figure 2:
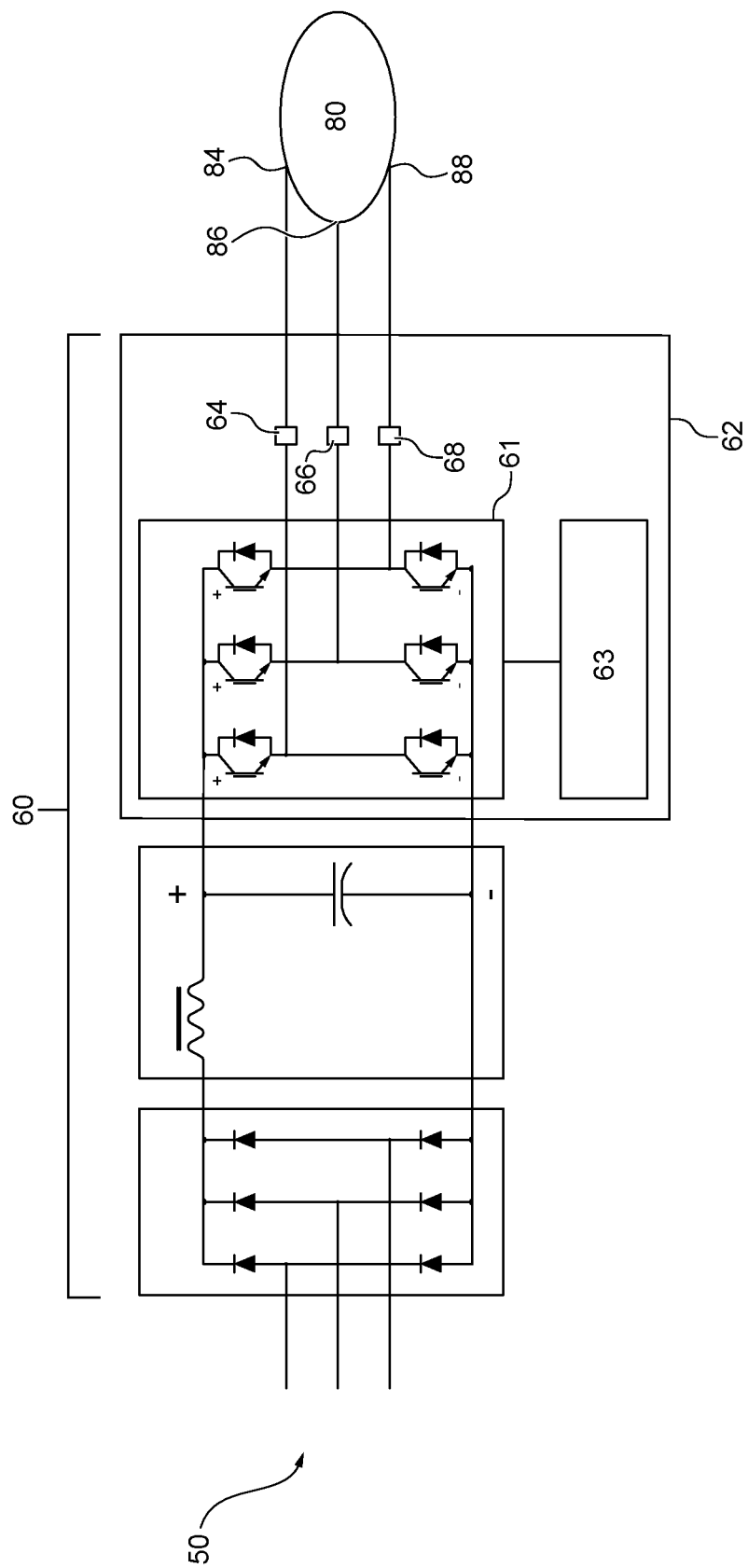
FIG. 2 is a simplified, schematic diagram of a VFD operatively connected to a power source and to a PM AC motor, in accordance with an aspect of the present technology.
Figure 3:
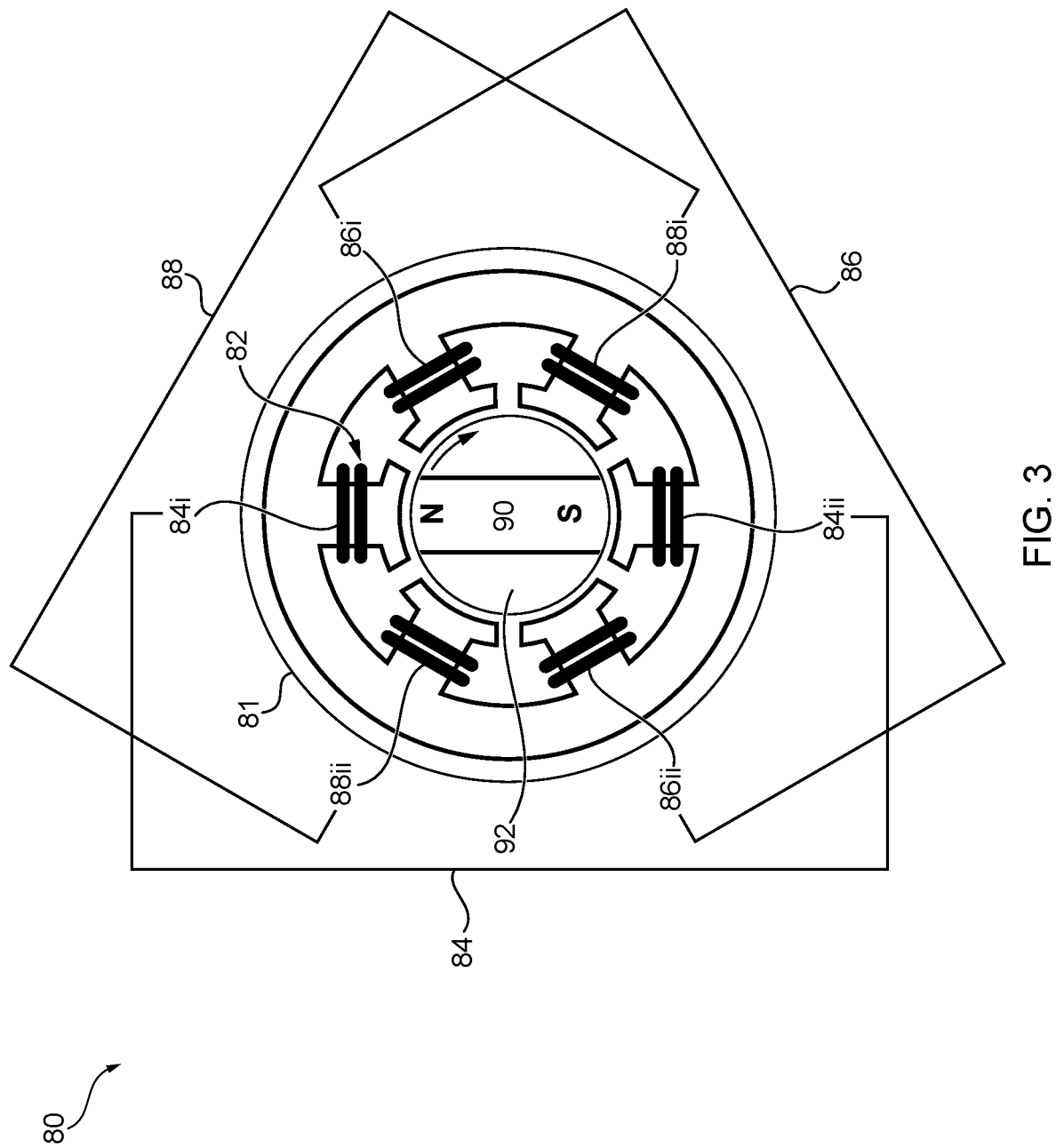
FIG. 3 is a simplified, schematic view of the PM AC motor of FIG. 2.

Referring to FIGS. 4 and 5, there are shown systems 40, 140 for controlling a plurality of PM AC motors in accordance with implementations of the present technology. FIGS. 2 and 3 illustrate certain components of the systems 40, 140 and are provided as an aid to understanding the functioning of the systems 40, 140 that will be described below. The systems 40, 140 include a power source 50, a Variable Frequency Drive (VFD) 60 and a plurality of permanent magnet electronically commutated motors (PM AC motors) 80 operatively connected to the VFD 60 (FIG. 2). In the systems 40, 140, the PM AC motors 80 are characterized by being free of a built-in VFD, and the VFD 60 is a single VFD used to simultaneously control the plurality of PM AC motors 80, as will be described further below.

It is to be noted that using a single VFD 60 for controlling the plurality of PM AC motors 80 goes against trends known in the industry, such as the air handling units industry, because the manufacturers of the new generation PM AC motors (i.e. PM AC motors that are free of a built-in VFD)

and VFDs (i.e. VFDs that are offered as standalone products) recommend operatively connecting one PM AC motor per VFD.

Figure 1:
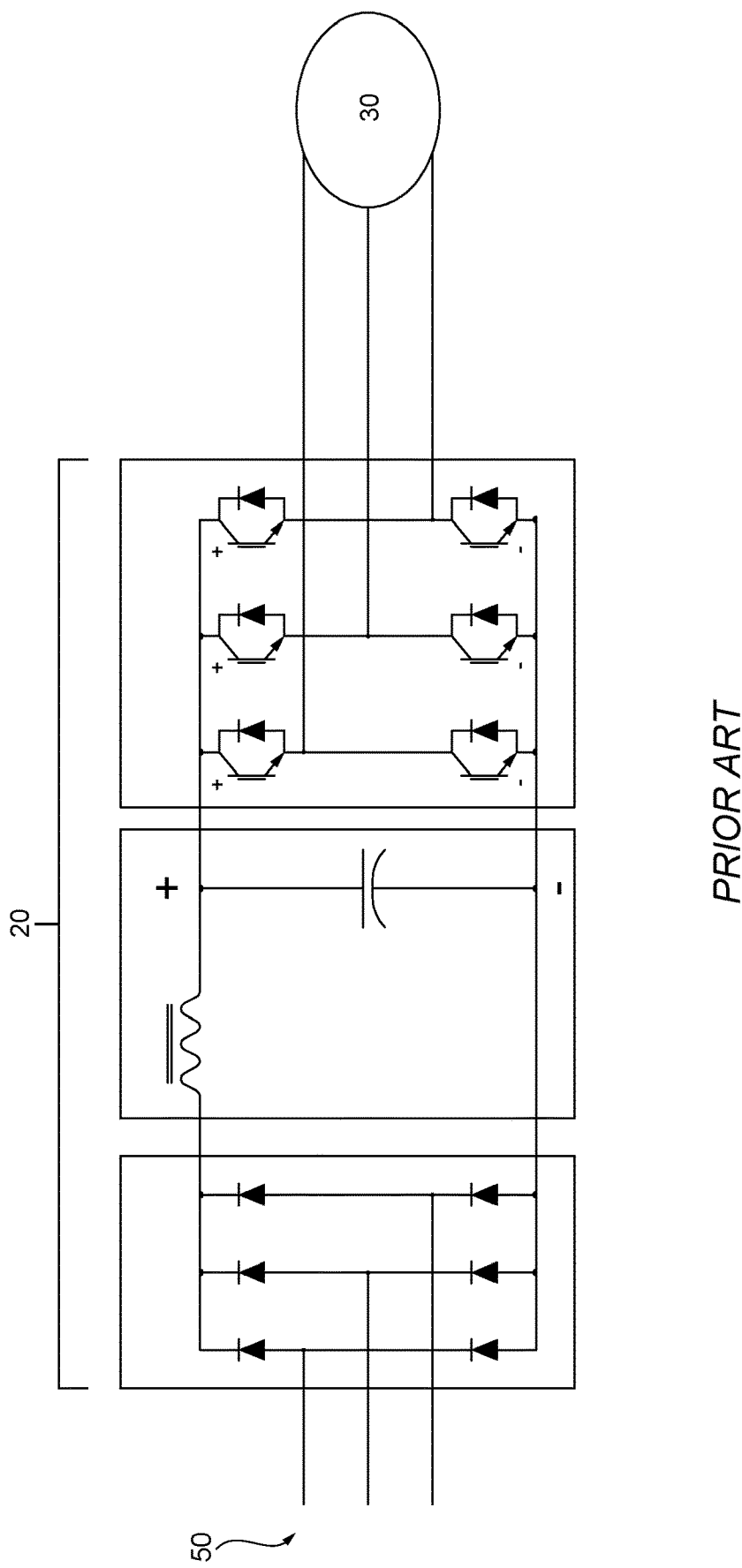
FIG. 1 is a simplified, schematic diagram of a Variable Frequency Drive (VFD) operatively connected to a power source and an AC motor, in accordance with a technology that forms part of the prior art.

In FIG. 1, there is shown a Variable Frequency Drive (VFD) 20 that is operatively connected to a three-phase AC motor (Asynchronous motor) 30 in accordance with technologies forming part of the prior art. Such VFD 20 could be connected to more than one AC motor (Asynchronous motor) 30. However, it is to be noted that the new generation VFD 60 that is referred to and described in the present application is not equivalent to the VFD 20. More detail regarding the characteristics of the VFD 60 and explanations as to how the VFD 60 differs from the VFD 20 are provided below.

Power Source

Referring to FIGS. 1, 2, 4 and 5, the power source 50 is three-phase AC current fed at 50 Hz or 60 Hz. Typically, the power source 50 is AC current readily available from the grid. In other implementations, the power source 50 could be AC current having same or different characteristics.

VFD

Referring to FIGS. 2 and 3, the VFD 60 receives the AC current from the power source 50, and the VFD 60 transforms the AC current from the power source 50 into pulses of AC current for driving in sequence each one of the phases 84, 86, 88 of the windings 82 of the PM AC motor 80 (FIG. 3). The pulses of AC current are triggered by the VFD 60 using the Back EMF of the PM AC motor 80 as a feedback to position the rotor of the PM AC motor 80. A sensorless controller 62 executes an algorithm that switches the frequency of the AC current provided to each phase 84, 86, 88 of the PM AC motor 80 at a variable rate. An electronic microcontroller 63 manages the pulses provided by an Insulated Gate Bipolar Transistor (IGBT) 61 to each phase 84, 86, 88 of the PM AC motor 80 in order to control the speed and torque of the PM AC motor 80.

Referring to FIGS. 2 and 3, the VFD 60 includes Current Transducers and Potential Transducers (CT/PT) 64, 66, 68 operatively connected to the electronic microcontroller 63. Each CT/PT 64, 66, 68 is operatively connected to a corresponding one of the three phases 84, 86, 88 of the PM AC motor 80. Through the CT/PTs 64, 66, 68, the VFD 60 is capable of quick and precise measuring of an AC voltage received back from each phase 84, 86, 88 of the PM AC motor 80. The AC voltage is induced in each one of the phases 84, 86, 88. The sensorless controller 62 treats the AC voltage measured by each CT/PT 64, 66, 68, and these AC voltage measurements provide reference points to the VFD 60 as to the positioning of the magnet 90 and shaft 92 of the PM AC motor 80 (FIG. 3) within the windings 82. Based on the positioning of the magnet 90 within the windings 82, the VFD 60 determines the appropriate voltage and triggering timing of the pulses of AC current to be provided to each phase 84, 86, 88.

Referring to FIGS. 1 and 2, it is to be noted that the VFD 60, through the CT/PTs 64, 66, 68 and the algorithm that is executed by its sensorless controller 62, is capable of treating the AC voltage measurements received from each phase 84, 86, 88 of the PM AC motor 80, which is something that cannot be performed by the VFD 20 that is used in conjunction with the AC motor 30 in accordance with technologies forming part of the prior art and shown in FIG. 1. Furthermore, using a VFD adapted for use with AC motors, like the VFD 20 of FIG. 1, in conjunction with the PM AC motor 80 of FIG. 2 would be impractical for several reasons, among which: (i) the VFD 20 is not capable of measuring the AC voltage received from each phase of the PM AC motor 80; and (ii) the VFD 20 does not have a dedicated mode in its firmware settings permitting the VFD 20 to be used in conjunction with a PM AC motor 80.

PM AC Motor

Referring to FIGS. 3, 4 and 5, the PM AC motors 80 that are used in the systems 40, 140 will be described in more detail. Each one of the PM AC motors 80 that is referred to in the description of the present technology is a high voltage, three-phase, and permanent magnet AC motor. An exemplary model of suitable PM AC motor 80 for use in the systems 40, 140 is free of any built-in VFD or electronic control circuit, and has the following characteristics:

a. Amperage at 400V: 4.5 A;
   b. Nominal shaft speed: 3100 rpm;
   c. Root Mean Square value of Back EMF at 1000 rpm (line to line): 96 V;
   d. Nominal Torque: 6 Nm;
   e. Phase resistance, measured on cable: 1.38Ω;
   f. Nominal power: 1.95 kW; and
   g. Inductance at d-axis position, phase value, measured on cable: 13.1 mH.

Compared to the AC motor 30 shown in FIG. 1, the PM AC motor 80 presents advantageous characteristics, such as but not limited to, improved durability, more compact design, reduced vibrations, reduced noise, increased torque at start, improved energy efficiency, reduced heat losses, and reduced friction between some of its components.

Referring to FIG. 3, the PM AC motor 80 has a housing 81, the windings 82 mounted within the housing 81, the permanent magnet 90 rotatably connected to the housing 81 and disposed within the windings 82, and the shaft 92 connected to the permanent magnet 90. Different configurations of the housing 81, permanent magnet 90, windings 82 and shaft 92 are contemplated. For example, the PM AC motor 80 could include a plurality of permanent magnets 90 disposed within the windings 82.

Referring to FIGS. 3, 4 and 5, a simplified, brief description of how each one of the PM AC motors 80 works is provided. Such description is not exhaustive, but sets forth certain working principles of the PM AC motor 80 that aid in understanding various aspects of the systems 40, 140 for controlling a plurality of PM AC motors 80 in accordance with the present technology.

The PM AC motor 80 is driven by pulses of AC current fed by the VFD 60 with appropriate timing, frequency and amperage, and these pulses of AC current are fed to each one of the phases 84, 86, 88 of the windings 82 in the following manner a. In the initial state shown in FIG. 3, a pulse of AC current magnetises pole $84_i$ as a south pole and pole $84_{ii}$ as north pole, drawing magnet 90 into its initial position. As the magnet 90 passes the first magnetised pole pair $84_i$-$84_{ii}$ forming the phase 84 of the windings 82, the AC current fed to pole pair $84_i$-$84_{ii}$ is switched to magnetise pole 84, as a north pole and pole $84_{ii}$ as a south pole, and a second pole pair $86_i$-$86_{ii}$ is fed with a pulse of AC current causing pole $86_i$ to be magnetised as a south pole and causing pole $86_{ii}$ to be magnetised as a north pole. The magnet 90 is thus drawn to rotate clockwise to align itself with pole pair $86_i$-$86_{ii}$, forming the phase 86 of the windings 82.

b. By pulsing AC current through the pole pairs $84_i$-$84_{ii}$ and $86_i$-$86_{ii}$ in sequence according to the switching frequency of the VFD 60, the magnet 90 will continue to rotate clockwise to keep itself aligned with the pole pair $86_i$-$86_{ii}$. Then, as the magnet 90 passes the second magnetised pole pair $86_i$-$86_{ii}$, the AC current fed to pole pair $86_i$-$86_{ii}$ is switched to magnetise pole $86_i$ as a north pole and pole $86_{ii}$ as a south pole, and a third pole pair $88_i$-$88_{ii}$ is fed with a pulse of AC current causing the pole $88_i$ to be magnetised as a south pole and causing pole $88_{ii}$ to be magnetised as a north pole. The magnet 90 is thus drawn to rotate clockwise to align itself with pole pair $88_i$-$88_{ii}$, forming the phase 88 of the windings 82.

c. As the magnet 90 passes the third magnetised pole pair $88_i$-$88_{ii}$, the AC current fed to pole pair $88_i$-$88_{ii}$ is switched to magnetise pole $88_i$ as a north pole and pole $88_{ii}$ as a south pole, and the AC current fed to the first pole pair $84_i$-$84_{ii}$ is switched so that pole $84_{ii}$ is magnetised as a south pole and pole $84_i$ is magnetised as a north pole. The magnet 90 is thus drawn to rotate clockwise to keep itself aligned with the pole pair $84_i$-$84_{ii}$.

d. Then, as the magnet 90 passes the first magnetised pole pair $84_i$-$84_{ii}$, the AC current fed to pole pair $84_i$-$84_{ii}$ is switched to magnetise pole $84_i$ as a south pole and pole $84_{ii}$ as a north pole, and the second pole pair $86_i$-$86_{ii}$ is fed with a pulse of AC current causing the pole $86_i$ to be magnetised as a south pole and causing pole $86_{ii}$ to be magnetised as a north pole. The magnet 90 is thus drawn to rotate clockwise to align itself with pole pair $86_i$-$86_{ii}$.

e. Then, as the magnet 90 passes the second magnetised pole pair $86_i$-$86_{ii}$, the AC current fed to pole pair $86_i$-$86_{ii}$ is switched to magnetise pole $86_i$ as a south pole and pole $86_{ii}$ as a north pole, and the third pole pair $88_i$-$88_{ii}$ is fed with a pulse of AC current causing the pole $88_i$ to be magnetised as a north pole and causing pole $88_{ii}$ to be magnetised as a south pole. The magnet 90 is thus drawn to rotate clockwise to align itself with pole pair $88_i$-$88_{ii}$.

f. As the magnet 90 passes the third magnetised pole pair $88_i$-$88_{ii}$, the AC current is fed to the first pole pair $84_i$-$84_{ii}$ back into the initial state so that the magnet 90 is drawn into its initial position shown in FIG. 3.

The feeding of the pulses of AC current to the phases 84, 86, 88 as described above is repeated, and the magnet 90 can thus be rotated within the windings 82, which in turn makes the shaft 92 of the PM AC motor 80 rotate. It is noted that, in contrast with some other types of electric motors, all three pole pairs $84_i$-$84_{ii}$, $86_i$-$86_{ii}$, $88_i$-$88_{ii}$ remain energised at any one time within the PM AC motor 80 to produce the rotating magnetic field which causes the magnet 90 to rotate.

The pulses of AC current are triggered by the sensorless controller 62 of the VFD 60. In operation, the sensorless controller 62 receives via the CT/PTs 64, 66, 68 AC voltage measurements which can be correlated by the algorithm executed by the sensorless controller 62 to the instantaneous angular position of the magnet 90 and the shaft 92 within the windings 82 of the PM AC motor 80. The frequency of the pulses of AC current is thus controlled by the speed of rotation of the shaft 92 of the PM AC motor 80. Such control of the frequency of the pulses of AC current to the phases 84, 86, 88 of the windings 82 is one of the features of the PM AC motor 80 that provides, under certain circumstances, increased energy-efficiency over asynchronous motors (AC motors) of comparable power output.

In order for the PM AC motor 80 to function properly with the VFD 60, it is necessary to access the firmware settings of the VFD 60 and to set the value of "back EMF constant" (in the present example, 96V @ 1000 rpm) for using the VFD 60 under "Synchronous Motor" mode. This is necessary because the algorithm executed by the sensorless controller 62 of the VFD 60 that triggers the pulses of AC current has to take into account how much voltage has to be provided when the magnet 90 and the shaft 92 of the PM AC motor 80 rotate at a given speed. This feature also makes the combination of the VFD 60 and the PM AC motor 80 suitable for applications where variable-speed operation is required.

Furthermore, it is also necessary to access the firmware settings of the VFD 60 to set the parameter of the VFD 60 to "Permanent Magnet motor control" mode, in cases where the VFD 60 is set for controlling an induction motor. As mentioned above, such settings are not found in VFDs adapted for use in conjunction with AC motors, such as the VFD 20 of FIG. 1.

Configuration in Parallel Arrangement

Referring to FIG. 4, the system 40 for controlling a plurality of PM AC motors 80 will be described. The system 40 includes the power source 50, the VFD 60 operatively connected to the power source 50, and three PM AC motors 80a, 80b, 80c operatively connected to the VFD 60 via a junction box 110. The PM AC motors 80a, 80b, 80c are identical to the PM AC motor 80 described above.

In the system 40, the three PM AC motors 80a, 80b, 80c are configured in parallel arrangement with respect to the VFD 60. In other implementations of the system 40, it is contemplated that two, or more than three PM AC motors 80 could be operatively connected to the VFD 60 in parallel arrangement via one or more junction boxes 110.

The junction box 110 is operatively connected to the VFD 60 via a set of wires 114, 116, 118 to handle the three-phase AC current that is provided by the VFD 60. In some implementations, the wires 114, 116, 118 could be replaced by bus bars or any other suitable conductors. The junction box 110 is operatively connected to the three PM AC motors 80a, 80b, 80c by a set of three wires for each one of the PM AC motors 80a, 80b, 80c for handling the three-phase AC current:

a. Wires 124a, 124b, 124c operatively connect the wire 114 to the phases 84a, 84b, 84c of each one of the PM AC motors 80a, 80b, 80c. The phases 84a, 84b, 84c correspond to the phase 84 of the PM AC motor 80 described above with reference to FIGS. 2 and 3.

b. Wires 126a, 126b, 126c operatively connect the wire 116 to the phases 86a, 86b, 86c of each one of the PM AC motors 80a, 80b, 80c. The phases 86a, 86b, 86c correspond to the phase 86 of the PM AC motor 80 described above with reference to FIGS. 2 and 3.

c. Wires 128a, 128b, 128c operatively connect the wire 118 to the phases 88a, 88b, 88c of each one of the PM AC motors 80a, 80b, 80c. The phases 88a, 88b, 88c correspond to the phase 88 of the PM AC motor 80 described above with reference to FIGS. 2 and 3.

When the system 40 is in operation, the pulses of AC current that are provided by the VFD 60 can simultaneously magnetise the phases 84a, 84b, 84c in an identical manner Pulses of AC current can also simultaneously magnetise the phases 86a, 86b, 86c in an identical manner, and the phases 88a, 88b, 88c in an identical manner Thus, the operation of the three PM AC motors 80a, 80b, 80c is simultaneously controlled by the VFD 60 and the operating conditions, such as speed of rotation and torque, of the three PM AC motors 80a, 80b, 80c are identical.

In other words, the three PM AC motors 80a, 80b, 80c are operated in a synchronized fashion by the VFD 60 because (i) the VFD 60 feeds pulses of AC current that are distributed simultaneously to the phases 84, 86, 88 of each one of the PM AC motors 80a, 80b, 80c, and (ii) the VFD 60 measures one value of the back EMF that is simultaneously true for all three PM AC motors 80a, 80b, 80c.

This configuration may prove to be advantageous in applications where a plurality of PM AC motors is to be operated with identical operating conditions. For instance, such configuration could be desirable in an air handling unit that comprises several fan units powered by PM AC motors, and where the fan units have identical operating conditions. By controlling a plurality of PM AC motors with a single VFD, the overall costs and complexity of the system 40 could be reduced, under certain circumstances, compared to other systems where each PM AC motor would be operatively connected to a corresponding VFD.

In some implementations, the impedance of each one of the wires 124, 126, 128 is equal. In some implementations, having equal impedances in each one of the wires 124, 126, 128 has been found to be of importance because an AC voltage variation from one wire to another may affect the value of the back EMF, which is the AC voltage measurement performed by the CT/PTs 64, 66, 68 of the VFD 60. If the impedance differs from one wire to another, the sensorless controller 62 of the VFD 60 may switch the frequency of the pulses of AC current provided to each phase 84, 86, 88 in an untimely fashion which may cause malfunctioning of one or more of the PM AC motors 80a, 80b, 80c.

In addition, in some implementations, the impedance of each one of the wires 124a, 124b, 124c, 126a, 126b, 126c, 128a, 128b, 128c is equal, and that because of the same reason as set forth above regarding the value of the back EMF AC voltage. It has been found that having equal impedances in the wires 124a, 124b, 124c, 126a, 126b, 126c, 128a, 128b, 128c reduces the likelihood of malfunctioning of the PM AC motors 80a, 80b, 80c. However, it is contemplated that the impedance of the wires 124a, 124b, 124c, 126a, 126b, 126c, 128a, 128b, 128c could be different from the impedance of the wires 124, 126, 128.

In some implementations where the wires 124a, 124b, 124c, 126a, 126b, 126c, 128a, 128b, 128c are made of the same material and are of the same gauge, the wires 124a, 124b, 124c, 126a, 126b, 126c, 128a, 128b, 128c are of equal length and equal diameter in order for the impedance to be equal in all of the wires.

Compensation Behavior

In the event the system 40 is in operation and one of the PM AC motors 80a, 80b, 80c suddenly stalls or becomes disconnected from the VFD 60, the VFD 60 receives a signal that there is a power loss within the system 40. Under certain circumstances, the signal can take the form of a very high current demand. In response to that signal, the VFD 60 can be configured, through the settings of its firmware, to supply additional power to the PM AC motors 80a, 80b, 80c so as to return to the power output set in the predetermined operating conditions of the VFD 60. As a consequence, the PM AC motors 80a, 80b, 80c that remain in operation will be driven by the VFD 60 to a power regime that is higher than before the sudden stalling or disconnection of one of the PM AC motors 80a, 80b, 80c.

Such behavior of the VFD 60 may be exploited advantageously under certain circumstances since the remaining PM AC motors 80a, 80b, 80c get to be driven at a higher power regime than before the occurrence of the sudden stalling or disconnection of one of the PM AC motors 80a, 80b, 80c. As a result, the remaining PM AC motors 80a, 80b, 80c can at least partially compensate for the PM AC motor that has failed or that has become disconnected from the system 40.

However, in order to gain advantage of this behavior, the operating conditions of the VFD 60 and of the PM AC motors 80a, 80b, 80c must be selected such that the VFD 60 and/or the remaining PM AC motors 80a, 80b, 80c could continue their operation without exceeding their respective capabilities.

The following exemplary scenario illustrates the compensation behavior described above. Referring to FIG. 4, the system 40 includes the three PM AC motors 80a, 80b, 80c that are each rated with a maximum power output of 2.0 kW. The VFD 60 is rated with a maximum power output of 6.0 kW. Initially, the VFD 60 is set to operate all three PM AC motors 80a, 80b, 80c at 50% of their respective capacity, which is 1.0 kW. As a result, the total load on the VFD is 3*1.0 kW=3.0 kW. Suddenly, the PM AC motor 80c stalls for an unknown reason. The VFD 60 receives a signal in the form of a very high current demand from the PM AC motors 80a, 80b, 80c. The VFD 60 reacts to this signal by supplying additional power to the PM AC motors 80a, 80b, 80c so as to return to the power output set in the operating conditions of the VFD 60, which is 3.0 kW. Since only the PM AC motors 80a, 80b remain in operation, the PM AC motors 80a, 80b each receive an equal amount of the power supplied by the VFD 60, which is 1.5 kW. As a result, the total power output of the system 40 remains 3.0 kW, but this power output is handled by the remaining two PM AC motors 80a, 80b.

The system 40 further includes motor contactors 169a, 169b, 169c and overloads 170a, 170b, 170c to isolate each one of the PM AC motors 80a, 80b, 80c from the VFD 60. The use of such motor contactors 169a, 169b, 169c and overloads 170a, 170b, 170c may also prevent errors in the measurements of the AC voltage by the CT/PTs of each one of the PM AC motors 80a, 80b, 80c in the event one of them suddenly stalls or becomes disconnected from the system 40.

Configuration in Serial Arrangement

Referring to FIG. 5, the system 140 for controlling a plurality of PM AC motors 80 will be described. The system 140 includes the power source 50, the VFD 60 operatively connected to the power source 50, and three PM AC motors 80a, 80b, 80c operatively connected to the VFD 60 via junction boxes 150a, 150b, 150c. The VFD 60, the PM AC motors 80a, 80b, 80c, the motor contactors 169a, 169b, 169c and overloads 170a, 170b, 170c are identical to the ones described above with reference to FIG. 4 and will not be described in further detail. In the system 140, the three PM AC motors 80a, 80b, 80c are configured in serial arrangement with respect to the VFD 60. In other words, the three PM AC motors 80a, 80b, 80c are daisy chained to the VFD 60. In other implementations of the system 140, it is contemplated that two, or more than three PM AC motors 80 could be operatively connected to the VFD 60 in serial arrangement via one or more junction boxes identical to the junction boxes 150a, 150b, 150c.

Wires 154a, 156a, 158a operatively connect the VFD 60 to the junction box 150a. Wires 164a, 166a, 168a are operatively connected to the wires 154a, 156a, 158a respectively, and operatively connect the junction box 150a to the PM AC motor 80a.

Wires 154b, 156b, 158b operatively connect the junction box 150a to junction box 150b. Wires 164b, 166b, 168b are operatively connected to the wires 154b, 156b, 158b respectively, and operatively connect the junction box 150b to the PM AC motor 80b.

Wires 154c, 156c, 158c operatively connect the junction box 150b to junction box 150c. Wires 164b, 166b, 168b are operatively connected to the wires 154*c*, 156*c*, 158*c* respectively, and operatively connect the junction box 150*c* to the PM AC motor 80*c*.

In some implementations, the total impedance of the following combination of wires are equal:
  a. wires 154*a*, 164*a*;
  b. wires 154*a*, 154*b*, 164*b*;
  c. wires 154*a*, 154*b*, 154*c*, 164*c*;
  d. wires 156*a*, 166*a*;
  e. wires 156*a*, 156*b*, 166*b*;
  f. wires 156*a*, 156*b*, 156*c*, 166*c*;
  g. wires 158*a*, 168*a*;
  h. wires 158*a*, 158*b*, 168*b*; and
  i. wires 158*a*, 158*b*, 158*c*, 168*c*.

Again, the three PM AC motors 80*a*, 80*b*, 80*c* are operated in a synchronized fashion by the VFD 60 because (i) the VFD 60 feeds pulses of AC current that are distributed simultaneously to the phases 84, 86, 88 of each one of the PM AC motors 80*a*, 80*b*, 80*c*, and (ii) the VFD 60 measures one value of the back EMF that is simultaneously true for all three PM AC motors 80*a*, 80*b*, 80*c*.

Once again, this configuration may prove to be advantageous in applications where a plurality of PM AC motors is to be operated with identical operating conditions, but where serial arrangement of the PM AC motors with respect to the VFD 60 is preferred over a parallel arrangement. For instance, such configuration could be desirable in an air handling unit that comprises several fan units powered by PM AC motors, and where the fan units have identical operating conditions.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A system for simultaneously controlling a plurality of permanent magnet electronically commutated motors with a single variable frequency drive, the system comprising:
  a single variable frequency drive operatively connected to a power source, wherein the single variable frequency drive measures a value of a signal of back electromotive force for the plurality of permanent magnet electronically commutated motors, and wherein the single variable frequency drive is configured as follows:
    back electromotive force is set to a constant value based on one permanent magnet electronically commutated motor of the plurality of permanent magnet electronically commutated motors;
    operation mode is set to synchronous motor;
    power output is set to be equal or greater than a sum of nominal power outputs of the plurality of permanent magnet electronically commutated motors; and
    control mode is set to permanent magnet motor; and
  the plurality of permanent magnet electronically commutated motors operatively connected to the power source through the single variable frequency drive, wherein each permanent magnet electronically commutated motor does not include a variable frequency drive,
wherein each permanent magnet electronically commutated motor is operated by the single variable frequency drive, and the plurality of permanent magnet electronically commutated motors generates the signal of back electromotive force, the single variable frequency drive receives the signal of back electromotive force, and the single variable frequency drive transmits, based on the signal of back electromotive force, pulses of alterative current distributed simultaneously to each motor of the plurality of permanent magnet electronically commutated motors.

2. The system of claim 1, further comprising a junction box connecting the single variable frequency drive to the plurality of permanent magnet electronically commutated motors by a plurality of sets of wires, each one of the sets of wires connecting the single variable frequency drive to a distinct one of the permanent magnet electronically commutated motors.

3. The system of claim 2, wherein the plurality of permanent magnet electronically commutated motors is connected in parallel with the single variable frequency drive.

4. The system of claim 3, wherein the sets of wires have equal impedance.

5. The system of claim 4, wherein each wire of the sets of wires has an equal length and an equal diameter.

6. The system of claim 2, wherein the plurality of permanent magnet electronically commutated motors is connected in a daisy chain arrangement to the single variable frequency drive.

7. The system of claim 1, wherein the single variable frequency drive comprises current transducers directly connected to the plurality of permanent magnet electronically commutated motors, and wherein the current transducers receive AC voltage measurements from the plurality of permanent magnet electronically commutated motors.

8. The system of claim 7, wherein the single variable frequency drive further comprises a sensorless controller for switching a frequency of the alternative current pulses provided to the plurality of permanent magnet electronically commutated motors at a variable rate.

9. The system of claim 8, wherein each one of the permanent magnet electronically commutated motor of the plurality of permanent magnet electronically commutated motors has a rotating shaft, a permanent magnet connected to the rotating shaft, and windings surrounding the permanent magnet and the rotating shaft, the windings defining pole pairs, the pole pairs being operatively connected to the single variable frequency drive, and the pole pairs remaining energised at any one time by the sensorless controller during operation of the system to produce a rotating magnetic field for rotating the permanent magnet and the rotating shaft.

10. The system of claim 8, wherein the pulses of alternative current are triggered by the sensorless controller based on a position of the rotating shaft determined by the AC voltage measurements.

11. The system of claim 1, wherein each one of the plurality of permanent magnet electronically commutated motors is a three-phase, synchronous permanent magnet alternative current motor.

12. The system of claim 1, wherein the single variable frequency drive is configured to:
  drive each of the permanent magnet electronically commutated motors at a first power regime, and
  in response to detecting that one or more of the permanent magnet electronically commutated motors has stalled or has become disconnected from the single variable frequency drive, drive the permanent magnet electronically commutated motors remaining in operation at a second power regime that is greater than the first power regime.

13. A system for simultaneously controlling a plurality of permanent magnet electronically commutated motors, the system comprising:
  a single variable frequency drive connected to a power source and to the plurality of permanent magnet electronically commutated motors, wherein the single variable frequency drive transmits pulses of AC current to the plurality of permanent magnet electronically commutated motors based on a position of one permanent magnet electronically commutated motor of the plurality of permanent magnet electronically commutated motors; and the plurality of permanent magnet electronically commutated motors, wherein each permanent magnet electronically commutated motor does not include a built-in variable frequency drive.

\* \* \* \* \*

UNITED STATES PATENT AND TRADEMARK OFFICE
CERTIFICATE OF CORRECTION

PATENT NO. : 11,196,362 B2
APPLICATION NO. : 16/411365
DATED : December 7, 2021
INVENTOR(S) : Lemieux et al.

Page 1 of 1

It is certified that error appears in the above-identified patent and that said Letters Patent is hereby corrected as shown below:

In the Claims

Columns 11 (Lines 66-67) and 12 (Lines 1-3), Claim 1 should read --of back electromotive force, and the single variable frequency drive transmits, based on the signal of back electromotive force, pulses of alternative current distributed simultaneously to each motor of the plurality of permanent magnet electronically commutated motors.--

Column 12 (Lines 44-47), Claim 10 should read --The system of claim 9, wherein the pulses of alternative current are triggered by the sensorless controller based on a position of the rotating shaft determined by the AC voltage measurements.--

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*